United States Patent [19]

Cremer et al.

[11] 4,044,104
[45] Aug. 23, 1977

[54] PRODUCTION OF PHOSPHORUS NITRIDES

[75] Inventors: Joseph Cremer, Hurth-Hermulheim; Egon Joerchel, Hochheim am Main; Heinz Harnisch, Cologne-Lovenich, all of Germany

[73] Assignee: Hoechst Aktiengesellschaft, Frankfurt am Main, Germany

[21] Appl. No.: 676,467

[22] Filed: Apr. 13, 1976

[30] Foreign Application Priority Data

Apr. 17, 1975 Germany ............................ 2516915
Feb. 27, 1976 Germany ............................ 2608018

[51] Int. Cl.$^2$ ...................... C01B 21/06; C01B 25/00
[52] U.S. Cl. ................................................... 423/302
[58] Field of Search ......................................... 423/302

[56] References Cited

U.S. PATENT DOCUMENTS

| 1,634,795 | 7/1927 | Miner | 423/302 |
| 1,634,796 | 7/1927 | Miner | 423/302 |

OTHER PUBLICATIONS

Becke–Goering et al., Chemische Berichte 91, 1958, 1188.

Primary Examiner—O. R. Vertiz
Assistant Examiner—Gregory A. Heller
Attorney, Agent, or Firm—Connolly and Hutz

[57] ABSTRACT

Phosphorus nitrides of the general formula $PN_x$, in which x stands for a number of 0.9 up to 1.7 are made. To this end, phosphorus halides are reacted with ammonia in gas phase, the ammonia being used in excess based on the phosphorus halides, and the resulting reaction product is heated to temperatures of up to 950° C until ammonia practically ceases to be evolved from the reaction product.

5 Claims, No Drawings

PRODUCTION OF PHOSPHORUS NITRIDES

The present invention relates to a process for making phosphorus nitrides of the general formula $PN_x$, in which $x$ stands for a number of 0.9 up to 1.7, wherein one ore more phosphorus halides are reacted with ammonia and the resulting reaction product is heated. The invention relates more particularly to the production of colorless phosphorus nitrides which have a composition similar to that of $P_3N_5$ and are very suitable for use in imparting flame-retardant properties to textile materials.

It has already been described that phosphorus nitrides can be made by thermal decomposition of products which are obtained by reacting $NH_3$ with phosphorus halides (Gmelins Handbuch der anorganischen Chemie, vol. phosphorus, part C, page 307, published by Verlag Franz Varrentrapp, Frankfurt/Main). Phosphorus nitrides can be obtained, for example, by reacting phosphorus halides with liquid $NH_3$, extracting the resulting ammonium chloride with organic solvents or liquid $NH_3$, and heating the resulting phosphazenes in a $NH_3$-atmosphere to temperatures of about 700° C (M. Becke-Goering, J. Schulze; Chemische Berichte, 91 (1958) 1188, published by Verlag Chemie GmbH, Weinheim/Bergstrasse).

The fact that $NH_3$ is used at temperatures at which it is in the liquid state and the fact that the reaction occurs spontaneously necessitate additional expenditure of machinery. To remove last residues of organic solvent, it is furthermore necessary for the product to be treated at relatively high temperatures at which the product is likely to become cracked, whereby it inevitably assumes an undesirable coloration and unpleasant smell. In other words, this is a process which is not very suitable for making phosphorus nitrides under commercially attractive conditions.

It is therefore an object of the present invention to provide a simple commercial process for making phosphorus nitrides, which is free from the adverse effects described hereinabove.

To this end, the invention provides for one or more phosphorus halides to be reacted with ammonia in gas phase, the ammonia being used in excess, based on the phosphorus halide, and for the resulting reaction product to be after-heated to temperatures of up to 950° C until ammonia practically ceases to be evolved from the reaction product.

The reaction should conveniently be effected at temperatures between the boiling point/sublimation point of the phosphorus halides and 250° C, normally at temperatures of up to 200° 1 C. It is also advantageous for the reaction product to be after-heated at temperatures of 500° up to 950° C, preferably 600° up to 800° C.

$PCl_5$ is the phosphorus halide which should most preferably be used for making colorless phosphorus nitride of the approximate composition $P_3N_5$, which is very suitable for use in imparting flame-retardant properties to textile materials.

The ammonolysis of phosphorus halides in gas phase would not have been expected, even by the expert, to be so complete that it is possible for the desirable compounds to be obtained substantially in the form of pure material by subjecting the reaction product to thermal after-treatment in the absence of $NH_3$. In addition to this, the present process enables the desirable products to be obtained in yields of more than 97%, based on phosphorus.

As mentioned above, it is good practice to use temperatures between the boiling point of the respective phosphorus halide and about 250° C for effecting the ammonolysis in gas phase, inasmuch as temperatures below the boiling or sublimation point effect an incomplete reaction, which only enables the solid or liquid particles' surface areas to be completely ammonolyzed with the resultant formation of not fully reacted products. Temperatures higher than indicated hereinabove produce compounds which tend to cake together and adhere to the wall of the reactor and thereby handicap undisturbed operation. In clear contrast therewith, loosely aggregated, pulverulent and non-caking products are obtained within the temperature range used in accordance with the invention. The reactants should preferably be used in the proportions which are necessary for the gas phase to always contain free ammonia. By after-heating the hot reaction products under inert gas (e.g. $N_2$, $H_2$, $NH_3$) the ammonolyzed phosphorus compounds are converted to desirable phosphorus nitrides while $NH_3$ is split off. At the same time, ammonium chloride has been found to become sublimed off substantially quantitatively so that it is unnecessary for it to be removed separately.

The reaction may be effected, e.g. in a scraper-provided cooler charged with inert gas, and the after-heatment may be effected continuously in a rotating tube placed downstream thereof.

The products so made have an apparent density not higher than 250 g/l, generally 40 up to 80 g/l.

Such low apparent density is desirable for the use of phosphorus nitrides as flame-retardant agents in cellulose, for example.

In clear contrast with this, higher apparent densities are desirable in all those cases in which the phosphorus nitrides are to be made, e.g. into the crystalline high temperature modification of $P_3N_5$. To carry out the necessary annealing treatment within commercially acceptable periods, it is an important requirement to use furnaces smaller in volume and, as a result of the improved thermal conductivity of the starting material, to provide for a lower temperature drop between the peripheral and nuclear zones of the substance. This is necessary last but not least in view of the fact that it is an imperative requirement for phosphorus nitrides to be heated and decomposed towards the end of the reaction at substantially equal temperatures so as to obtain highly crystalline material.

It has also unexpectedly been found that phosphorus nitrides of high apparent density, i.e. of 400 up to 800 g/l, preferably 500 up to 700 g/l, can be obtained by quenching the hot reaction products with water, separating the resulting phosphorus nitride from the suspension, e.g. by decantation, filtration or centrifugation, and drying it. In this operation, $PCl_5$ should preferably be used as the starting material. Phosphorus trichloride is less suitable as it tends to form decomposition products which impair the yield.

The reaction may conveniently be carried out in an electrically heated quartz vessel having a water quenching system placed downstream thereof.

EXAMPLE 1

$PCl_3$ was evaporated in a stream of nitrogen and introduced together with $NH_3$ into a coolable reactor. The $NH_3$ was used in the quantity necessary for the issuing gas to always contain free $NH_3$. The gas phase reaction temperature in the reactor was maintained at 150 up to 170° C by cooling.

The resulting reaction product was a loose powder. It was after-heated in a heat rotating tube under nitrogen to 800° C and orange to red-brown colored phosphorus nitride containing 59 weight % of P and 39 weight % of N was obtained. The yield was higher than 98 weight %, based on P.

EXAMPLE 2

The apparatus was the same as that described in Example 1.

Gaseous $PCl_5$ was reacted in a stream of nitrogen with with $NH_3$. $NH_3$ in excess was always present in the gas chamber of the reactor and a temperature of 180 up to 200° C was maintained therein. The resulting reaction product was after-heated in a $N_2/H_2$-stream at 700° C. The resulting completely colorless phosphorus nitride contained 55 weight % of P and 43 weight % of N. It was obtained in a yield of 98 weight %, based on P.

EXAMPLE 3

$PCl_5$ was evaporated in a stream of nitrogen and introduced together with $NH_3$ into an electrically heated quartz tube. $NH_3$ was used in the quantity necessary for the gas phase to always contain free $NH_3$. The gaseous reaction products were maintained for about 30 seconds at 550 up to 650° C. The reaction gas coming from the quartz tube was quenched with water at 40° C, the resulting phosphorus nitride was separated by filtration from the suspension, and dried. It then had an apparent density of 750 g/l. The product contained 54 weight % of P and 43 weight % of N. It was obtained in a yield higher than 96 weight %, based on P.

EXAMPLE 4

The starting materials and apparatus were the same as those used in Example 1, but the reaction gas was after-heated for about 15 seconds to 700 up to 800° C and then quenched with water at 12° C. The resulting phosphorus nitride had an apparent density of 600 g/l. It contained 56 weight % of P and 42 weight % of N, and was obtained in a yield of more than 97 weight %, based on P.

We claim:
1. In the process for making phosphorus nitrides of the general formula $PN_x$, in which $x$ stands for a number of 0.9 to 1.7 by reacting phosphorus halides with ammonia and heating the resulting reaction product, the improvement which comprises reacting the phosphorus halides with the ammonia in the gas phase at temperatures between the boiling or sublimation point of the phosphorus halides and 250° C, the ammonia being used in excess, based on the phosphorus halides, and after-heating the resulting reaction product to temperatures of 500° to 950° C until ammonia substantially ceases to be evolved from the reaction product whereby $PH_x$ is obtained in yields of about 97 percent based on phosphorus.

2. The process as claimed in claim 1, wherein the reaction is effected at temperatures between the boiling point or sublimation point of the phosphorus halides and 200° C.

3. The process as claimed in claim 1, wherein the reaction product is after-heated to temperatures of 600° to 800° C.

4. The process as claimed in claim 1, wherein colorless phosphorus nitrides corresponding substantially to the compound $P_3N_5$ are made from $PCl_5$.

5. The process as claimed in claim 1, wherein phosphorus nitrides of high apparent density are made by quenching the hot reaction products with water and separating the phosphorus nitrides from the resulting suspension.

* * * * *